United States Patent
Thomas et al.

(10) Patent No.: US 9,062,727 B2
(45) Date of Patent: Jun. 23, 2015

(54) DISC BRAKE CALIPER

(71) Applicant: MERITOR HEAVY VEHICLE BRAKING SYSTEMS (UK) LIMITED, Cwmbran, Gwent (GB)

(72) Inventors: Paul Thomas, Gwent (GB); Refaat Malki, Gwent (GB); Martin Taylor, Gwent (GB); Paul Roberts, Gwent (GB)

(73) Assignee: Meritor Heavy Braking Systems (UK) Limited, Cwmbran, Gwent (GB)

( * ) Notice: Subject to any disclaimer, the term of this patent is extended or adjusted under 35 U.S.C. 154(b) by 61 days.

(21) Appl. No.: 13/776,798

(22) Filed: Feb. 26, 2013

(65) Prior Publication Data
US 2013/0240305 A1 Sep. 19, 2013

(30) Foreign Application Priority Data

Mar. 16, 2012 (EP) .................................. 12159877

(51) Int. Cl.
*F16D 65/00* (2006.01)
*F16D 65/18* (2006.01)
*F16D 65/56* (2006.01)

(52) U.S. Cl.
CPC .......... *F16D 65/0075* (2013.01); *F16D 65/183* (2013.01); *F16D 65/568* (2013.01)

(58) Field of Classification Search
CPC . F16D 65/0075; F16D 65/183; F16D 65/568; F16D 55/2265
USPC ........ 188/72.4, 72.1, 72.5, 71.1, 71.9, 1.11 L, 188/1.11 W, 196 V
See application file for complete search history.

(56) References Cited

U.S. PATENT DOCUMENTS

| | | | | |
|---|---|---|---|---|
| 4,503,946 | A * | 3/1985 | Davidson et al. | 188/71.9 |
| 5,433,298 | A * | 7/1995 | Antony et al. | 188/72.7 |
| 5,568,845 | A * | 10/1996 | Baumgartner et al. | 188/71.9 |
| 5,819,884 | A * | 10/1998 | Giering | 188/71.9 |
| 5,833,035 | A * | 11/1998 | Severinsson | 188/72.7 |
| 5,848,672 | A * | 12/1998 | Brearley et al. | 188/1.11 L |
| 6,129,183 | A * | 10/2000 | Ward | 188/1.11 L |
| 6,186,286 | B1 * | 2/2001 | Haussler et al. | 188/72.1 |
| 6,276,494 | B1 * | 8/2001 | Ward et al. | 188/1.11 W |

(Continued)

FOREIGN PATENT DOCUMENTS

| CN | 1326055 A | 12/2001 |
|---|---|---|
| CN | 1690466 A | 11/2005 |

(Continued)

OTHER PUBLICATIONS

European Patent and Trademark Office, Extended Search Report for the corresponding European Patent Application No. 13152037.1 mailed Sep. 19, 2013.

(Continued)

*Primary Examiner* — Thomas J Williams
*Assistant Examiner* — Mariano Sy
(74) *Attorney, Agent, or Firm* — Brooks Kushman P.C.

(57) ABSTRACT

The present invention provides a disc brake caliper. The disc brake caliper has a housing and a piston for moving a friction element into contact with a rotor. A yoke is provided for at least partially guiding the piston, and the yoke is positioned within the housing and moveable relative to the housing. A guide member along which the yoke is slideable is provided, and the guide member is a component separate to the yoke and the housing, and is mounted to the housing.

19 Claims, 9 Drawing Sheets

(56) References Cited

U.S. PATENT DOCUMENTS

| | | | |
|---|---|---|---|
| 6,435,319 B1 * | 8/2002 | Thomas et al. | 188/72.1 |
| 7,152,716 B2 * | 12/2006 | Taylor et al. | 188/71.8 |
| 8,016,082 B2 * | 9/2011 | Niehorster et al. | 188/72.9 |
| 2002/0014374 A1 * | 2/2002 | Ortegren et al. | 188/72.1 |
| 2005/0252727 A1 * | 11/2005 | England et al. | 188/1.11 L |
| 2009/0026024 A1 | 1/2009 | Baldeosingh et al. | |

FOREIGN PATENT DOCUMENTS

| | | |
|---|---|---|
| CN | 1948778 A | 4/2007 |
| DE | 9305631 U1 | 8/1994 |
| EP | 0168303 A1 | 1/1986 |
| EP | 0684403 A1 | 11/1995 |
| EP | 1160478 A2 | 5/2001 |
| EP | 1126191 A2 | 8/2001 |
| EP | 1160478 A2 | 12/2001 |
| JP | 2009264506 A | 11/2009 |
| JP | 2010255652 A * | 11/2010 |
| KR | 20060053702 A | 5/2006 |

OTHER PUBLICATIONS

European Patent Office; Search Report; Oct. 26, 2012; 6 Pages; Rijswijk, Netherlands.

Chinese Patent Office, Chinese Search Report for the corresponding Chinese Patent Application No. 201310053639.1 mailed Apr. 3, 2015.

* cited by examiner

DISC BRAKE CALIPER

TECHNICAL FIELD

The present invention relates to a disc brake caliper. In particular, the present invention relates to a disc brake caliper for use on a heavy vehicle.

BACKGROUND

Air actuated disc brakes are frequently used on heavy vehicles. The configuration of these brakes varies. One type of disc brake of the prior art is described in EP0684403.

The disc brake described in EP0684403 has an outboard brake pad and an inboard brake pad. A brake disc is positioned between the two brake pads. A single pressure spindle is positioned in a housing of a brake caliper and is operable to push the inboard brake pad towards the brake disc. The brake disc is fixed in an inboard-outboard direction, such that movement along an axis perpendicular to a principal plane of the brake disc is prevented. This arrangement is such that when the inboard brake pad is pushed towards and contacts the brake disc this causes the caliper to move inboard. As the caliper moves inboard it moves the outboard brake pad towards the brake disc clamping the brake disc between the outboard and the inboard pads and thereby effecting braking by frictionally inhibiting rotation of the brake disc.

The pressure spindle is guided by a yoke which is positioned within the housing of the caliper. A lever is operable to slide the yoke within the housing, so as to move the pressure spindle and inboard brake pad towards the brake disc. Four elongate projections are formed on the surface of the yoke and on the surface of the housing, and are provided as a guidance system to guide the yoke when sliding in the housing.

One disadvantage of such a guidance system is the difficulty of manufacturing the projections to the required close tolerance. A further disadvantage of the system is that it is susceptible to wear over the life of the disc brake.

SUMMARY

The present invention aims to alleviate one or more of the problems associated with the prior art.

Accordingly, in a first aspect the present invention provides a disc brake caliper having:
a housing;
a piston for moving a friction element into contact with a rotor;
a yoke for at least partially guiding the piston, the yoke being positioned within the housing and moveable relative to the housing; and
a guide member along which the yoke is slideable;
wherein the guide member is a separate component to the yoke and housing and is mounted to the housing.

Advantageously, the use of a guide member may reduce the need for or simplify machining of guide surfaces, which may mean that the disc brake caliper of the present invention is easier to manufacture than disc brake calipers of the prior art.

The guide member may be removably mounted to the housing. This means that the guide member can more easily be made from a different material to give improved friction and wear characteristics.

The disc brake caliper may have two pistons for moving a friction element into contact with a rotor.

In some embodiments, the guide member is a guide pin. In the present application a pin refers to an elongate member having any suitable cross section.

The guide pin may be a dowel.

The guide pin may comprise a fastener. The fastener may be threadingly engagable with the housing. A threaded engagement between the guide pin and the housing eases the assembly of components of the disc brake caliper.

Alternatively, the guide member may be connected to the housing via an interference fit. For example, the guide member may be assembled to the housing using a press fit.

The guide member may be connected to the housing via a cantilever mount.

The disc brake caliper may comprise a cover plate. The cover plate may be mounted to a rotor side of the disc brake caliper. The guide member may extend from the housing towards the cover plate. In exemplary embodiments, the guide member may extend from the housing towards the cover plate to a position spaced from the cover plate, so as to form a gap between the guide pin and the cover plate. Providing a gap substantially eliminates contact of the guide pin with the cover plate, which prevents transfer of loading from the guide pin to the cover plate. Alternatively, the guide member may extend from the housing to the cover plate.

In some embodiments, a bore is formed in the yoke for sliding engagement with the guide pin. The provision of a bore in the yoke is advantageous because the yoke is supported in two axes around the circumference of the bore, and therefore the location and guidance of the yoke is improved compared to disc brake calipers of the prior art. In such embodiments, a bush may be located within the bore.

Alternatively, in such embodiments, the bore may be formed with a profile that minimises the area of contact between the guide member and the bore, for example, the bore may have three semi-circular elongate protrusions formed therein and extending along the length of the bore.

In some embodiments, a recess is formed in the yoke for sliding engagement with the guide pin.

In some embodiments, the disc brake caliper comprises at least two guide members, wherein one of the guide members is positioned in an opposing region of the yoke compared to another guide member, so as to limit tilting movement of the yoke within the housing. Limiting the tilting movement of the yoke within the housing inhibits the yoke from rattling within the housing and reduces the risk of inducing taper pad wear.

The disc brake caliper may comprise two guide members, and one of the guide members may be a guide pin and the other guide member may be a functional component of the disc brake caliper. In this application the term "functional component" refers to a component of the disc brake caliper that has a primary function other than guiding the yoke. Advantageously, such an arrangement reduces the number of components of the caliper, which can reduce manufacturing costs. The functional component may be a wear sensor arm of a manual adjuster. The wear sensor arm may also be referred to as the adjuster stem of the manual adjuster. The manual adjuster may be used for example during replacement of friction elements of the disc brake caliper. The adjuster stem may be connected to the pistons such that rotation of the adjuster stem causes the piston to move away from a rotor of the disc brake, for example, the adjuster stem may be connected to the pistons via a series of gears.

Alternatively, the wear sensor arm (or adjuster stem) may not be a guide member, and instead, the yoke may comprise a recess for accommodating (but not being guided on) an adjuster stem of a manual adjuster.

The yoke may comprise cut-outs for reducing the volume of the yoke. The cut-outs reduce the amount of material of the yoke and therefore reduce the weight of the yoke. The cut-outs may be positioned circumferentially around a portion of the yoke used to guide the pistons.

The yoke may comprise one or more holes extending axially though the yoke for reducing the volume of the yoke. Alternatively, or additionally, the yoke may comprise one or more depressions, e.g. on one or more faces of the yoke for reducing the volume of the yoke. Reducing the volume of the yoke reduces the weight of the yoke.

In exemplary embodiments, the cut-outs may be positioned at one or both axial extents of a guide bush of the yoke. The cut-outs may be tapered from a wider end at an axial end of the guide bush to a narrower end at an axially central position of the guide bush. The cross-section of each cut-out may be semi-circular.

The yoke may comprise a cylindrical guide bush for receiving a piston. The yoke may comprise two cylindrical guide bushes each for receiving a piston. The guide bush and piston may each comprise complimentary mating members for limiting rotation of the piston relative to the yoke.

The yoke may comprise one or more concave formations around the circumference of the yoke for reducing the volume of the yoke. The one or more concave formations reduce the amount of material of the yoke and therefore reduce the weight of the yoke. The one or more concave formations may be positioned between a region of a bore of the yoke and a guide bush of the yoke. The yoke may comprise two guide bushes and one or more concave formations may be positioned circumferentially between the two guide bushes. For example, the yoke may comprise an aperture in a central region, and a concave formation may be positioned in a region between each guide bush and the aperture.

In some embodiments, one or more guide surfaces may be formed on a surface of the yoke for opposing one or more guide surfaces formed on a surface of the housing. In an exemplary embodiment, the guide member may be a guide pin, and a bore may be formed in the yoke for sliding engagement with the guide pin. The guide pin and bore may be positioned towards one side of the yoke, and the guide surfaces may be formed on two opposing surfaces of the yoke and housing towards an end of the yoke opposite the position of the guide pin and bore. Such an arrangement advantageously eases assembly and manufacture of the disc brake caliper, whilst achieving the advantage of limiting tilting of the yoke relative to the housing so as to prevent jamming of the yoke in the housing.

The guide pin may have a circular or oval cross section. Alternatively, the pin may have a central section along which the yoke is slideable and the central section may have a profile such that the area of the pin contacting the yoke is minimised. For example, the central section may have a cross section shaped as a cross, or a Y.

In a second aspect the invention provides a yoke for use in a disc brake caliper of the type having a housing, a piston for moving a friction element into contact with a rotor, and a guide member mounted to the housing, the yoke being dimensioned to be positionable within the housing and being configured to be slideable along the guide member.

The yoke of the second aspect may be used in the disc brake of the first aspect.

In a third aspect the present invention provides a yoke for at least partially guiding a piston within a housing of a disc brake, the yoke comprising:

a guide bush for receiving a piston;

an anti-rotation feature for limiting rotation of a piston relative to the guide bush; and a guide surface, for example a bore, for guiding the yoke along a guide surface, e.g. a guide member, of a housing of a disc brake such that, in use, the yoke can slide relative to said housing.

The yoke may comprise cut-outs for reducing the weight of the yoke. The cut-outs reduce the amount of material of the yoke and therefore reduce the weight of the yoke. The cut-outs may be positioned circumferentially around the guide bush.

In exemplary embodiments, the cut-outs may be positioned at one or both axial extents of the guide bush. The cut-outs may be tapered from a wider end at an axial end of the guide bush to a narrower end at an axially central position of the guide bush. The cross-section of each cut-out may be semi-circular.

The yoke may comprise one or more concave formations around the circumference of the yoke for reducing the volume of the yoke. The concave formations reduce the amount of material of the yoke and therefore reduce the weight of the yoke. The one or more concave formations may be positioned between a region of the bore and the guide bush. The yoke may comprise two guide bushes and one or more concave formations may be positioned circumferentially between the two guide bushes. For example, the yoke may comprise an aperture in a central region, and a concave formation may be positioned in a region between each guide bush and the aperture.

The yoke may comprise one or more holes extending axially though the yoke for reducing the volume of the yoke. Alternatively, or additionally, the yoke may comprise one or more depressions, e.g. on one or more faces of the yoke for reducing the volume of the yoke. Reducing the volume of the yoke reduces the weight of the yoke.

The guide bush may be a cylindrical guide bush for receiving a piston. The yoke may comprise two cylindrical guide bushes each for receiving a piston. The anti-rotation feature may be a mating member for mating with a complimentary mating member of a piston.

One or more guide surfaces may be formed on a surface of the yoke for opposing one or more guide surfaces formed on a surface of a housing of a disc brake.

The bore may be positioned towards one side of the yoke. In such embodiments, guide surfaces may be formed on a surface of the yoke for opposing one or more guide surfaces formed on a surface of a housing of a disc brake, and the guide surfaces may be positioned at an end of the yoke opposite the position of the bore.

The yoke may comprise a recess at one side for accommodating a wear sensor arm of a disc brake.

The bore may be positioned towards one side of the yoke and a recess may be formed at an opposite side of the yoke. For example, the recess may be formed for accommodating a wear sensor arm of a disc brake.

The yoke of the third aspect may be for use with the disc brake of the first aspect.

A fourth aspect of the invention provides a yoke comprising cut-outs to reduce the weight of the yoke.

The yoke of the fourth aspect may have one or more of the optional features of the yoke of the third aspect.

BRIEF DESCRIPTION OF THE DRAWINGS

Embodiments according to the invention will now be described in more detail with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
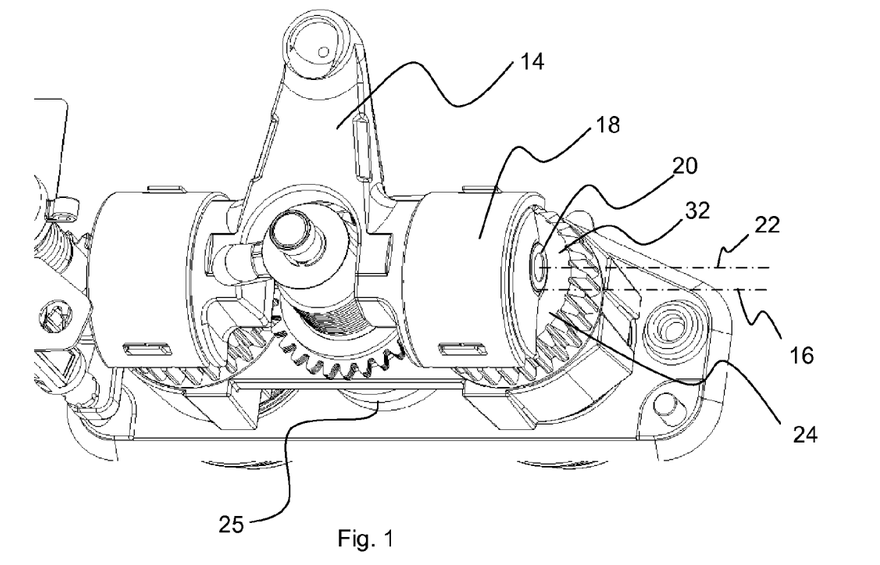
FIG. 1 shows a perspective view of a disc brake caliper having a similar operation as embodiments of the invention.
Figure 2:
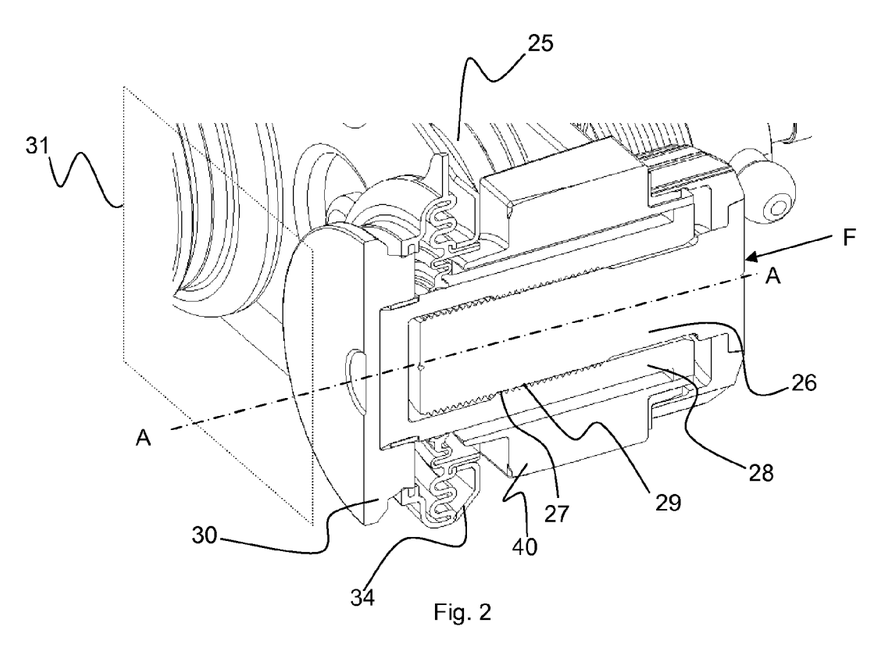
FIG. 2 shows a vertical cross-section through a housing, a piston and yoke of the brake caliper shown in FIG. 1.

With reference to FIGS. 1 and 2 there is shown components of a brake (not shown fully) having a brake caliper. The brake caliper shown in FIGS. 1 and 2 does not incorporate the guide member of the present invention but is shown to illustrate the function and operation of a brake caliper to which the present invention is applicable. The brake includes brake pads (not shown) for clamping a brake disc (not shown), when a power actuator (not shown) is applied. An operating shaft 14 is rotatable about an axis 16 defined by bearings 18. Rollers 20 having roller axis 22, offset from axis 16, engage respective piston assemblies 24. Piston assembly 24 has a rotating part 26 and a non-rotating part 28. The rotating part 26 has a male thread 27 threaded into female thread 29 of the non-rotating part 28. The non-rotating part 28 is connected to a head part 30 which engages a back plate of the brake pad. As will be appreciated, a force F applied by the respective roller 20 to the piston assembly 24 will be transmitted via the rotating part 26 and then via the non-rotating part 28 and then via the head part 30 to the brake pad.

An end of the head part 30 of the piston assembly 24 defines a plane 31 that is substantially parallel to the plane of the brake disc (not shown). The piston assembly 24 is positioned along an axis A-A that is substantially perpendicular to the plane 31 of the piston head part.

As the brake pad wears, it is necessary to compensate for such wear by increasing the length of the piston assemblies 24. This is achieved by rotating the piston gear 32 so as to rotate the rotating part 26 relative to the non-rotating part 28 thereby increasing the overall length of the piston assembly 24.

The brake of FIGS. 1 and 2 has two identical piston assemblies 24 mounted within a yoke 40. However, in other embodiments there may only be one piston assembly. The yoke 40 is movable parallel to axis A-A towards and away from the rotor together with the piston assemblies during brake application and release. A separate pressed cover plate 34 seals the head part and the housing.

In this embodiment the cover plate 34 is a pressed sheet metal component, preferably sheet steel with a suitable corrosion resistant coating such as an epoxy coating, zinc passivated coating or stainless steel. The plate 34 is preferably stamped from steel sheet having a thickness of 1.5-2 mm. In other embodiments the cover plate may be forged or cast.

Figure 6:
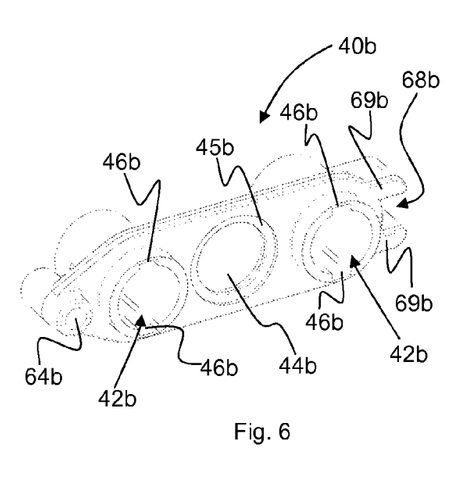
FIG. 6 shows a perspective view of a yoke of the brake caliper shown in FIG. 4.

A resilient return element in the form of a helical return spring 25 is mounted between the cover plate 34 and a circular recess (not shown in FIGS. 1 and 2, but corresponds to the recess 45b, 45c of the yoke 40b, 40c shown in FIGS. 6 and 8) of the yoke 40. The spring provides a force to return the piston assemblies and rotary actuating member to a brake-off position when the power actuator is released.

As the yoke is not required to transmit the brake thrust from the rotary actuating member to the piston assemblies, and because it is enclosed within the housing, it is not necessary for it to be a particularly corrosion resistant component. Therefore the yoke may conveniently be manufactured from lower strength materials such as aluminium or engineering plastics such as ABS or high molecular weight polyethylene using lower cost, higher volume processes such as die casting, extrusion, sintering or injection moulding.

The yoke 40 guides the piston assemblies 24. The features of the yoke 40 are not shown in detail in FIG. 1 or 2, but the yoke shares the following described features of the yoke 40b, 40c shown in FIGS. 6, 7 and 8. The yoke 40b, 40c includes a generally cylindrical guide bush 42b, 42c located either side if an aperture 44b, 44c, and each guide bush is configured to receive a piston assembly 24b, 24c. However, for adjustment of the length of the piston assemblies to be achieved, it remains necessary for rotation of the piston assemblies to be prevented. Thus, an anti-rotation formation is provided which includes first and second radially inward facing opposing slots 46b, 46c that extend parallel to axis A-A along the full length of bushes 42b, 42c. A recess 45b, 45c surrounds the aperture 44b, 44c and is positioned to accommodate the helical return spring.

Embodiments of the invention will now be described in more detail. Similar reference numerals are used for features similar to those shown in FIGS. 1 and 2, but a suffix of "a", "b", "c", "d", "e", or "f" is used to distinguish between the brake caliper of FIGS. 1 and 2, and embodiments of the present invention.

Figure 3:
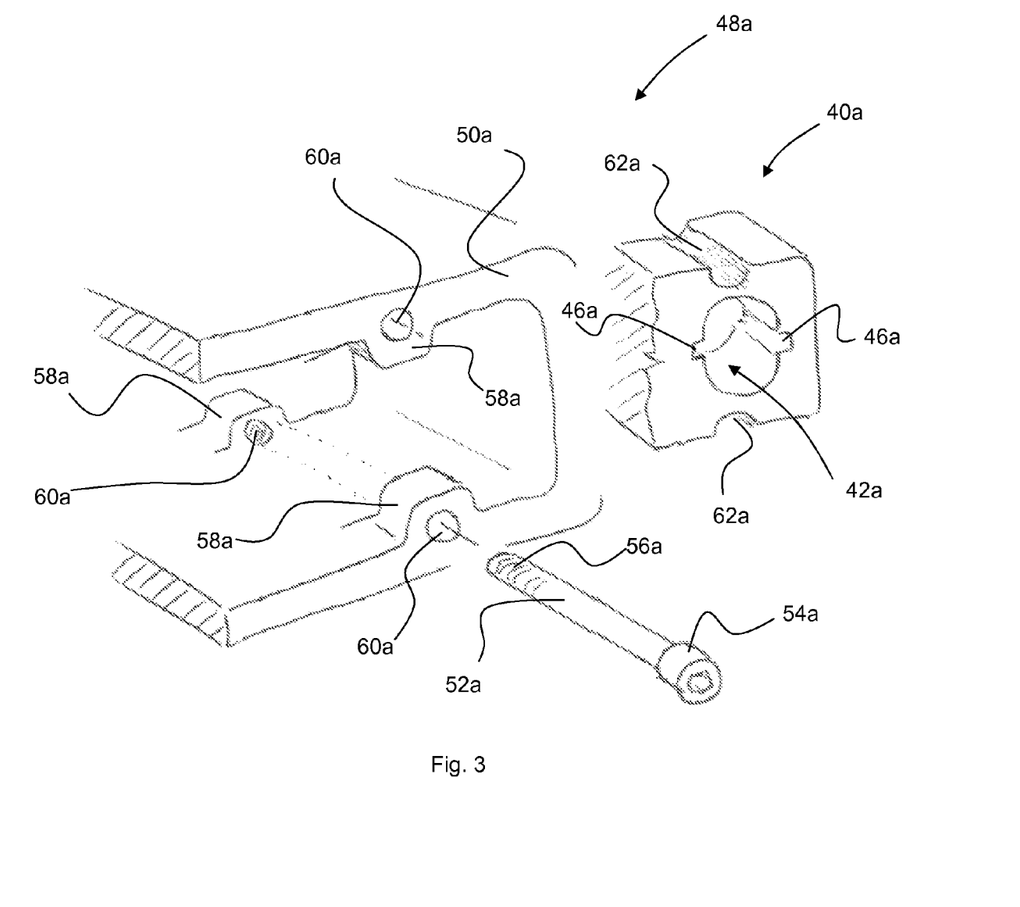
FIG. 3 shows a perspective partial view of a housing and a yoke of a disc brake caliper according to a first embodiment of the invention.

Referring now to FIG. 3, a portion of a brake caliper 48a according to an embodiment of the present invention is shown. As previously described, the brake caliper has a housing 50*a* and a yoke 40*a* positioned within the housing. The yoke has anti-rotation features 46*a,* similar to those described above.

The housing 50*a* comprises eight projections 58*a* (only three of which are shown in FIG. 3). The projections are positioned such that two of the protections oppose the another two projections in a direction parallel to axis A-A, and two of the said projections oppose the other two said projections in a direction parallel to the plane of the rotor. A hole 60*a* is formed in each projection, and at least two of the projections have a thread. The other five projections are of a similar configuration to the projections 58*a* shown, four of which are positioned at an opposite side of the housing.

A guide member in this embodiment is a threaded fastener 52*a* having a threaded end portion 56*a* opposing a head 54*a*. Intermediate the threaded end and the head of the fastener is substantially smooth. The hole 60*a* formed in each projection 58*a* is dimensioned so as to receive the fastener. When fastened to the housing, the fastener extends along an axis parallel to axis A-A, and is received by the two projections positioned on the corresponding axis. The thread of the fastener screws into the thread of the corresponding hole. A second fastener (not shown) extends through the opposing two projections, such that the second fastener is also threadingly engaged with one of the holes and extends along an axis parallel to axis A-A. Similarly, a further two fasteners extend through the other projections positioned at the opposite side of the housing.

The yoke 40*a* has two elongate recesses 62*a* formed on its outer surface and along the length thereof on the upper and lower surface of the yoke. The elongate recesses are dimensioned such that they are complimentary to the fastener 52*a*, such that the yoke can slide along the guide members.

In this embodiment, the fastener 52*a* extends through the cover plate (not shown), so as to attach the cover plate to the housing. Thus, the fastener has a dual function of guiding the yoke, and attaching the cover plate to the housing.

Although in this embodiment four fasteners have been used, in alternative embodiments, one, two, or any appropriate number of fasteners may be used, and the appropriate number of projections 58*a* and holes 60*a* provided on the housing. For example, two fasteners may be provided at one end of the yoke. In alternative embodiments the fasteners may not be threadingly engaged with the housing and some other method of assembly may be used, for example a nut may secure the fastener to the housing. Alternatively, the fastener may be a dowel secured by any appropriate means.

Figure 4:
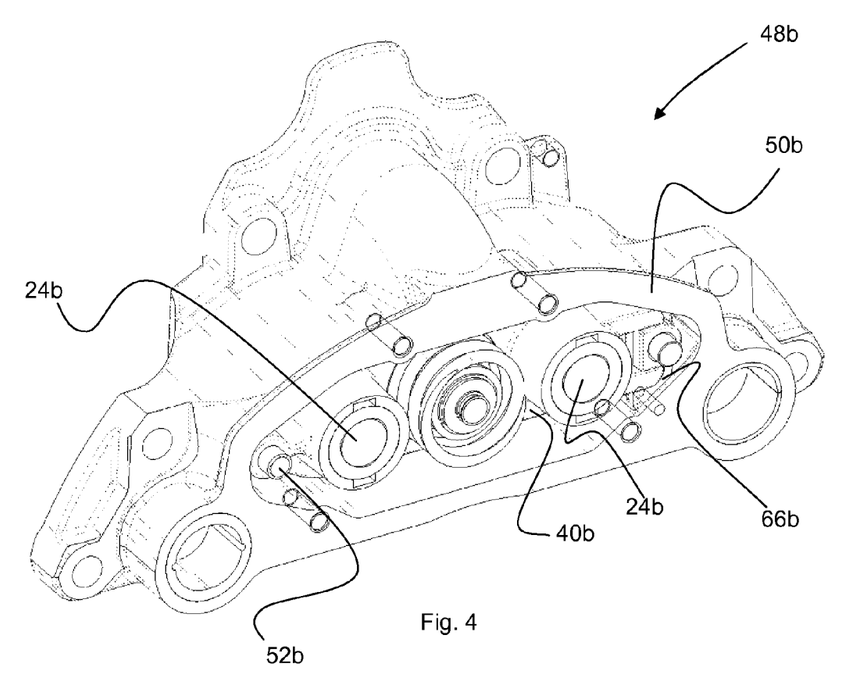
FIG. 4 shows a perspective view of a brake caliper according to a second embodiment of the invention.

A brake caliper according to another embodiment of the present invention is indicated generally at 48*b* in FIG. 4. Similar to previously described embodiments, the caliper has a housing 50*b* within which a yoke 40*b* is slideable. The yoke is shown in more detail in FIG. 6. The features of the yoke previously described will not be repeated again here. Similar features are given the same reference numeral but have a suffix "b". The yoke has a bore 64*b* formed therein and extending longitudinally along an axis parallel to axis A-A. In this embodiment the bore is formed adjacent to one of the bushes 42*b* on a side opposite to the aperture 44*b*, at a side of the yoke corresponding to a trailing edge of the brake pad in the preferred direction of vehicle motion when the brake caliper is mounted to a vehicle in the preferred orientation. Reference to the preferred orientation refers the most common mounting orientation, but the brake caliper may be mounted in any other suitable orientation. Two projections 69*b* extend from a side of the yoke, opposite to the side of the yoke in which the bore 64*b* is formed, to form a recess 68*b*, such that the recess is adjacent the other bush 42*b* at a side opposite the aperture 44*b*.

Referring to FIG. 4, a guide member, in this embodiment a dowel 52*b*, is fastened to the housing 50*b* and extends between the housing and the cover plate 34*b* along an axis parallel to axis A-A. A pressed formation 35*b* in the cover plate supports the dowel. Alternatively, as shown in later discussed embodiments, the pressed formation 35*b* may be provided to accommodate the dowel and provide no or reduced support.

To assemble the caliper, the yoke 40*b* is positioned in the housing 50*b*, such that the axis of the dowel 52*b* is substantially coincident with the axis of the bore 64*b* formed in the yoke, so that in use the yoke can slide along the guide member.

In this embodiment, the yoke 40*b* is also guided by a second guide member 66*b* (shown in FIG. 4), which does not have the primary function of being a guide member, and in this embodiment is the wear sensor arm of a manual adjuster. When the yoke is positioned within the housing 50*b*, the recess 68*b* is aligned with the wear sensor arm, so that the yoke is slideable about the wear sensor arm.

Figure 5:
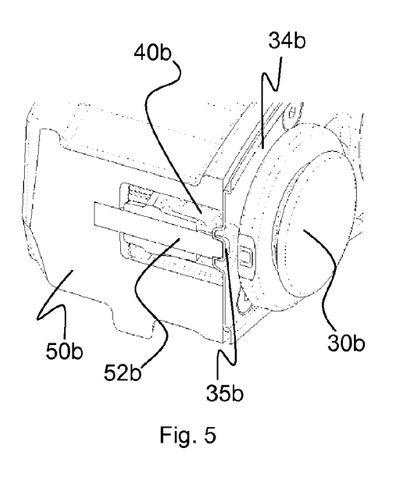
FIG. 5 shows a vertical cross-section through a housing, a guide member and a yoke of the brake caliper shown in FIG. 4.
Figure 7:
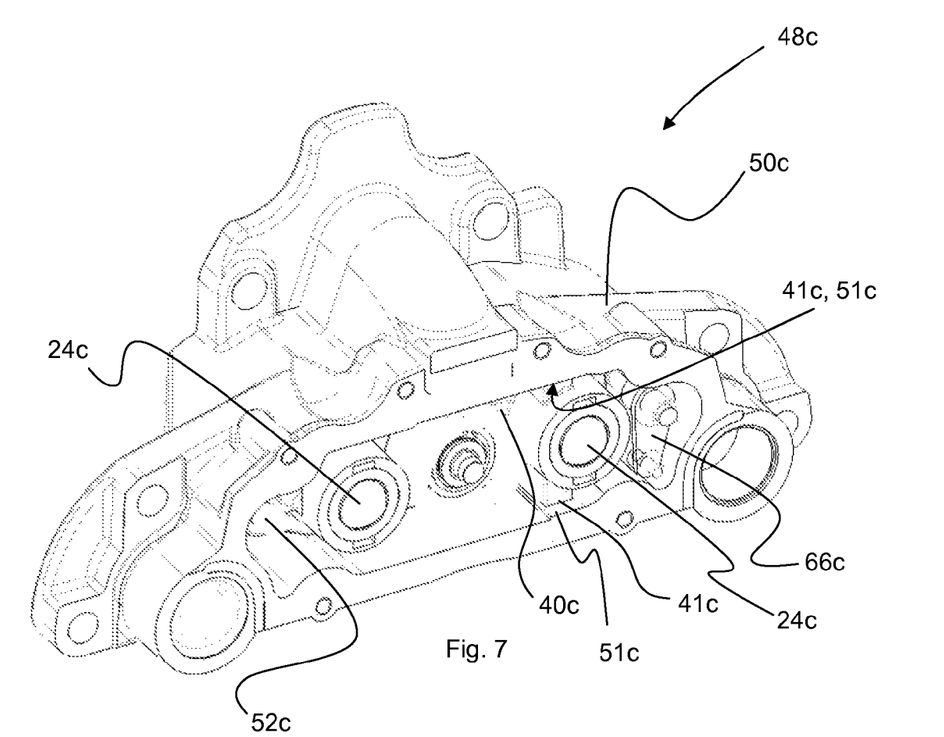
FIG. 7 shows a perspective view of a brake caliper according to a third embodiment of the invention.
Figure 8:
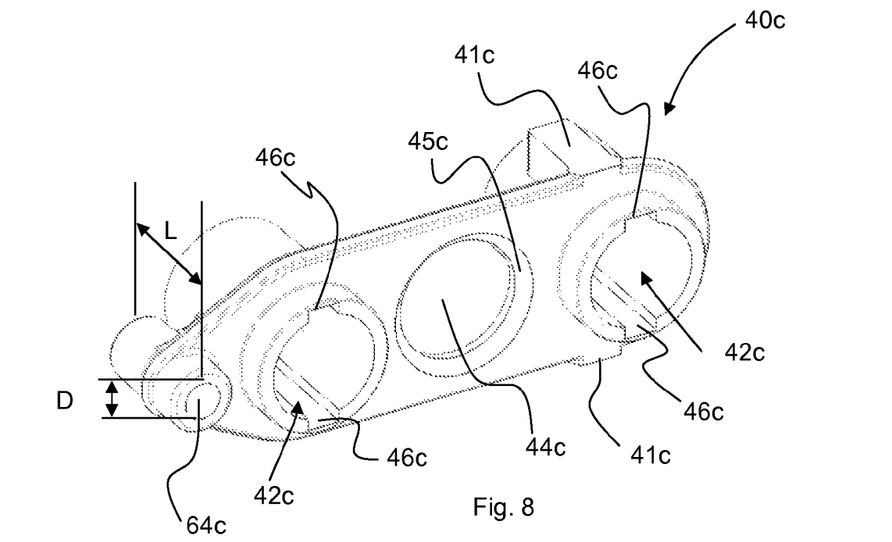
FIG. 8 shows a perspective view of a yoke of the brake caliper shown in FIG. 7.
Figure 9:
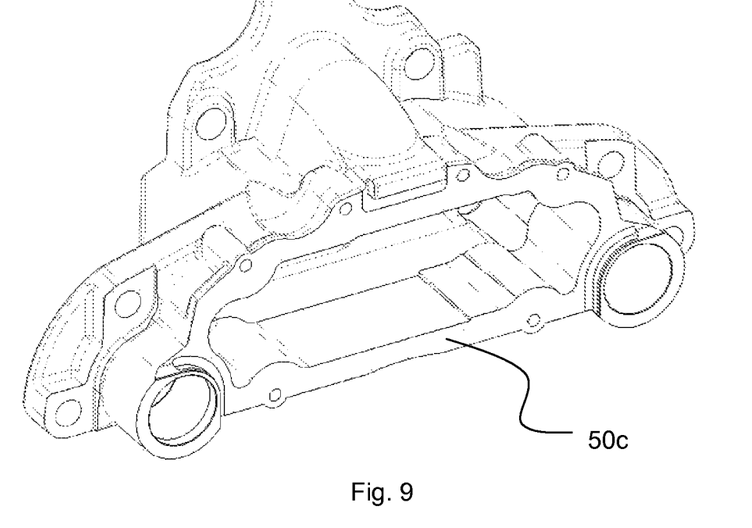
FIG. 9 shows a perspective view of a housing of the brake caliper shown in FIG. 7.

Referring to FIGS. 7 to 9, a further embodiment according to the present invention is shown. This embodiment is similar to the embodiment shown in FIGS. 4 to 6, in that a yoke 40*c* is slideable in a housing 50*c*, and the yoke has a bore 64*c* for receiving a guide member, which in this embodiment is in the form of a dowel 52*c*. The bore and the dowel are formed and positioned in the same manner as the embodiment of FIGS. 4 to 6, so these features will not be described further. Similar features are given the same reference numeral but with a suffix "c". For example, the second guide member 66*b* of FIG. 4 is labelled 66*c* in FIG. 7.

The main difference between this embodiment and the previously described embodiment is that no recess is formed in the yoke 40*c*. When the yoke is positioned in the housing it is guided along dowel 52*c*. In addition to dowel 52*c*, the yoke is also guided along guide surfaces 41*c*, 51*c* formed on the surface of the yoke and the housing, and positioned such that the guide surface 41*c* of the yoke opposes the guide surface 51*c* of the housing. The guide surfaces are substantially elongate rectangular surfaces. In this embodiment two guide surfaces are provided on opposing upper and lower surfaces of the yoke, and two guide surfaces are provided on the housing in opposition to said guide surfaces of the yoke. These surfaces may be formed in the surface of the housing and/or the yoke during the forming process or may be machined into the surface, if formed during the forming process the surfaces may be finished machined.

Figure 10:
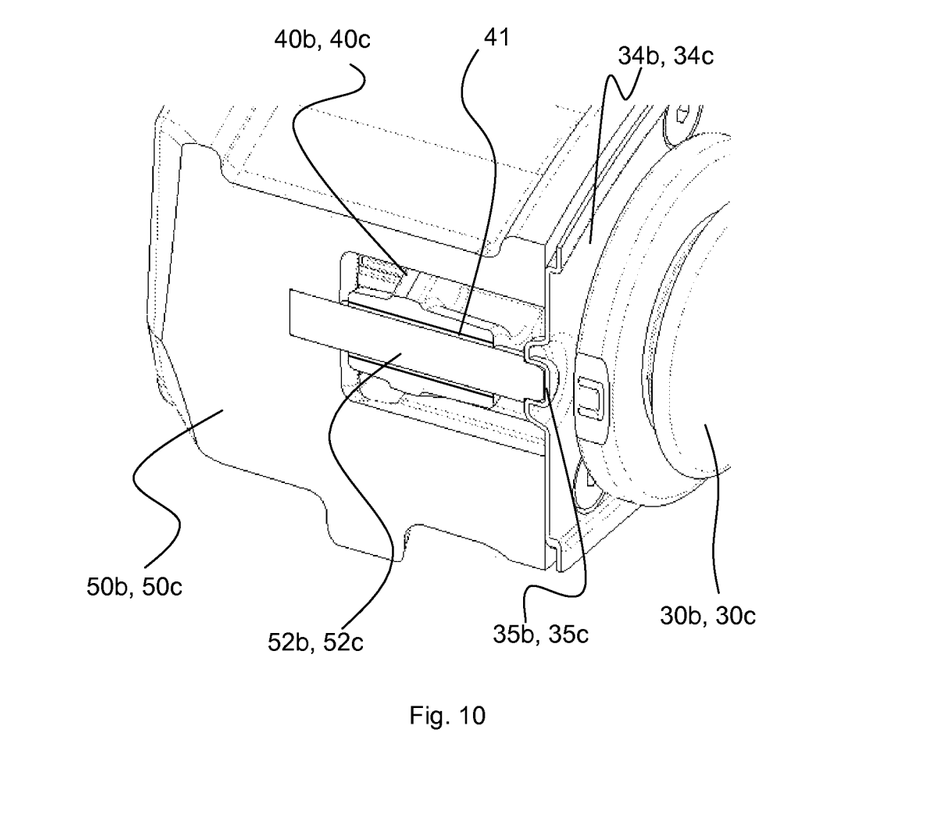
FIG. 10 shows a vertical cross-section through a housing, a guide member and a yoke of the brake caliper shown in FIG. 4 or 7, when a bush is positioned in a bore of the yoke.
Figure 11:
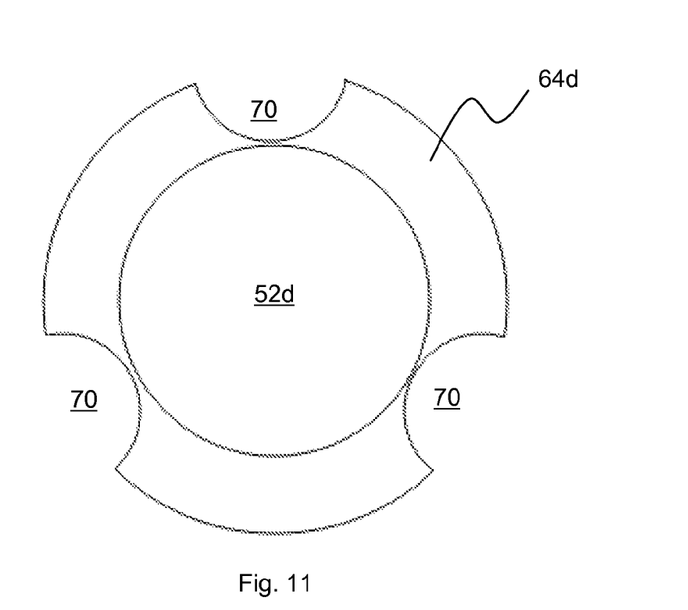
FIG. 11 shows a section view of a bore formed in a housing, and a guide member of a brake caliper according to a fourth embodiment of the invention.

In both embodiments shown in FIGS. 4 to 9, a bush 41 may be positioned in the bore 64*b*, 64*c* of the yoke 40*b*, 40*c*, between the yoke and the dowel 52*b*, 52*c*, as shown in FIG. 10. The bush may minimise wear of the yoke and the dowel, particularly if the bush is made from a softer material than the yoke and/or the guide member.

In alternative embodiments to the embodiments shown in FIGS. 4 to 9, the guide member may be a fastener instead of a dowel. In other embodiments, there may be more guide members. For example, there may be two opposing guide members at one or both ends of the yoke, similar to the embodiment of FIG. 3. In the embodiments shown in FIGS. 4 to 9, the dowel is fastened to the housing by placing the dowel in a hole in the housing that is dimensioned so as to be a close fit. Alternatively, the fit may be an interference fit, or an adhesive may be used. In other embodiments the dowel may be fastened to the housing using a screw thread.

Referring to FIGS. 14 to 17, a further embodiment according to the invention is shown. This embodiment is similar to the embodiment shown in FIGS. 7 to 10, in that a yoke 40g is slideable in a housing 50g, and the yoke has a bore 64g for receiving a dowel 52g. The bore and the dowel are formed and positioned in the same manner as the embodiment of FIGS. 4 to 10, so these features will not be described further. Similar features are given the same reference numeral but with a suffix "g".

Similarly to the embodiment of FIGS. 7 to 10, the yoke 40g is guided in the housing 50g via a bore 64g and dowel 52g, in addition to complimentary guide surfaces 41g, 51g formed in the housing 50g and the yoke 40g. However, in the presently described embodiment the yoke 40g is not guided on the wear sensor arm 72g of the manual adjuster. Instead a recess 74g is formed in the yoke so as to accommodate the wear sensor arm 72g.

Figure 14:
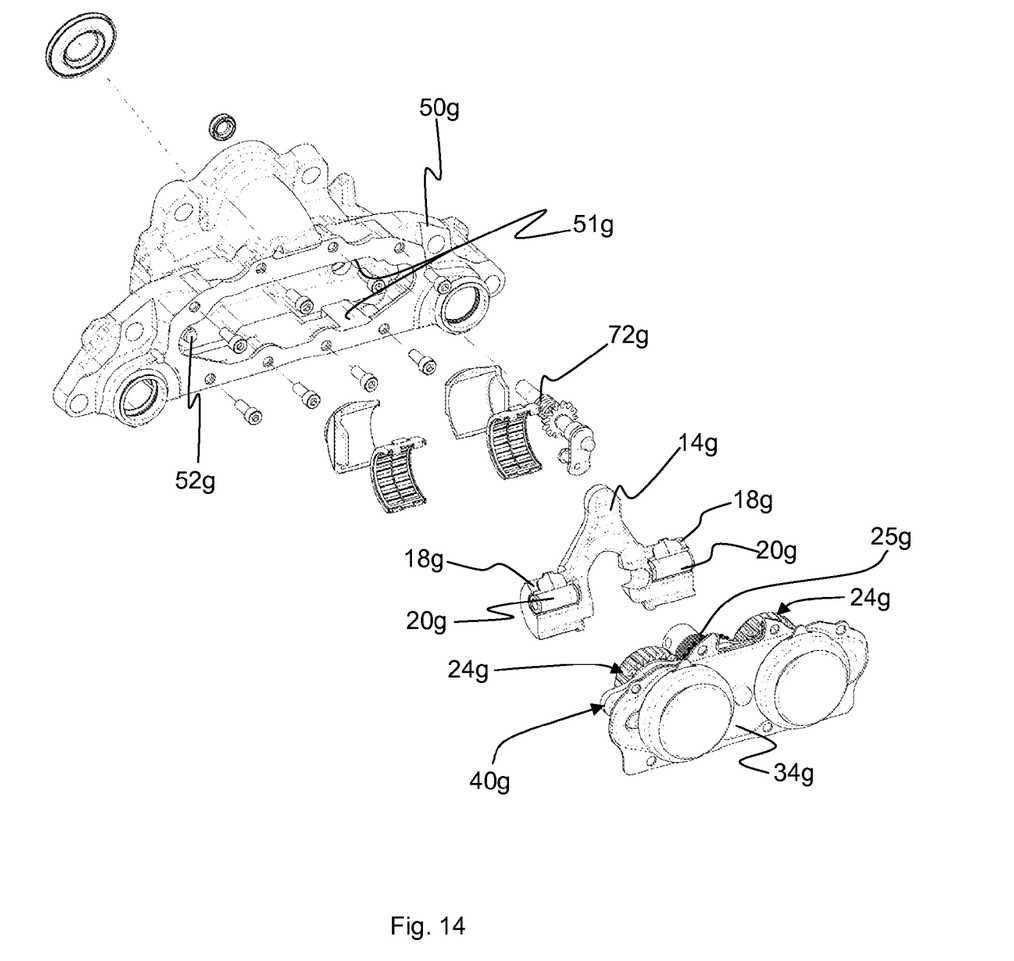
FIG. 14 shows an exploded perspective view of a brake caliper according to a seventh embodiment of the invention.

The dowel 52g is press fitted into the housing so as to be mounted in the housing via a cantilever mount. In alternative embodiments other methods of forming an interference fit may be used, or other methods of cantilever mounting may be used e.g. using an adhesive or threaded engagement. The dowel 52g extends from the housing 50g towards the cover plate 34g to a position spaced from the cover plate 34g, so as to form a gap between the cover plate 34g and the dowel 52g. The cover plate 34g in this embodiment is made from a relatively thin sheet steel pressing and is not designed to have the strength to withstand significant loadings. Providing a gap between the dowel 52g and the cover plate 34g ensures that, in use, high loads are not transferred from the dowel 52g to the cover plate 34g.

A bush may be optionally provided in the bore 64g to reduce the machining tolerance required for the bore 64g and to improve wear resistance. The bush may be a phosphor bronze bush.

Advantageously, guiding the yoke using a dowel 52g and bore 64g at one side of the yoke and guide surfaces 41g, 51g towards the other side of the yoke reduces the precision of manufacture and assembly required, whilst also inhibiting, in use, jamming of the yoke in the housing.

In the present embodiment, the cover plate 34g comprises two pressed formations 35g which form a depression in the cover plate on the piston side of the cover plate 34g and a protrusion on the rotor side of the cover plate 34g. One of the pressed formations is provided to support the wear sensor arm 72g. Two pressed formations are provided so that the cover plate 34g can be used in presently described caliper and a caliper intended for an opposite handed disc brake.

Figure 15:
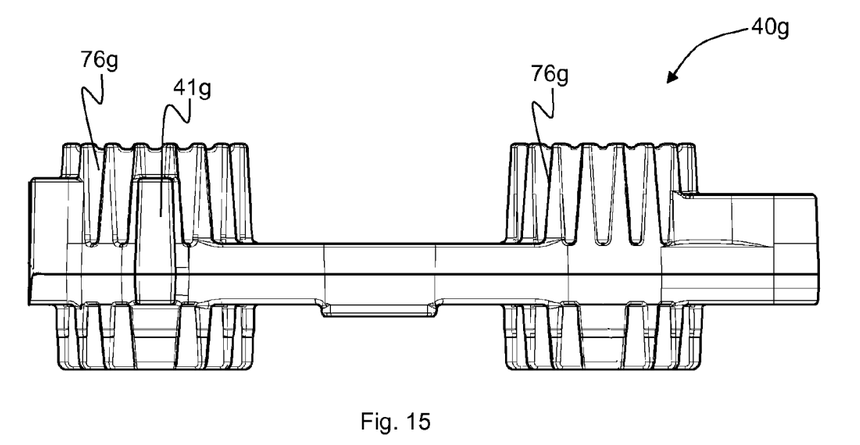
FIG. 15 shows a plan view of a yoke of the brake caliper of FIG. 14.
Figure 16:
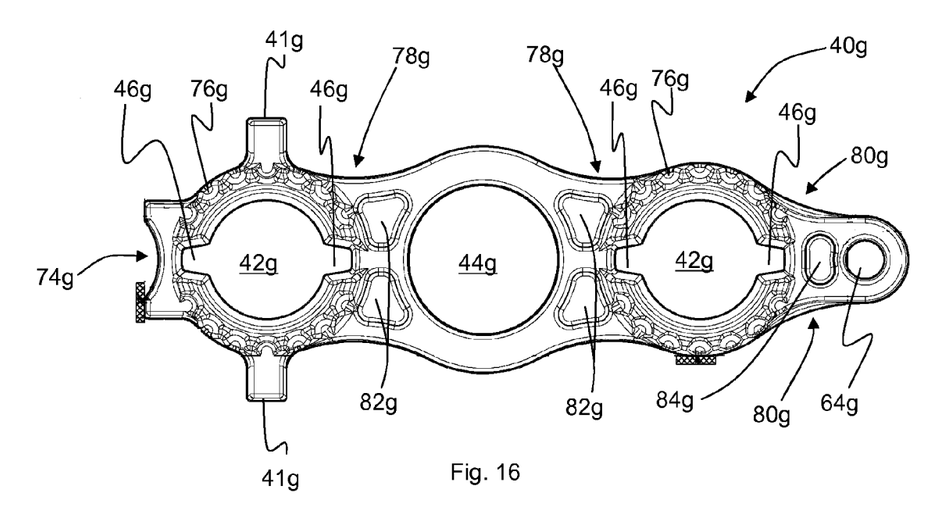
FIG. 16 shows an end view of the yoke of FIG. 15.
Figure 17:
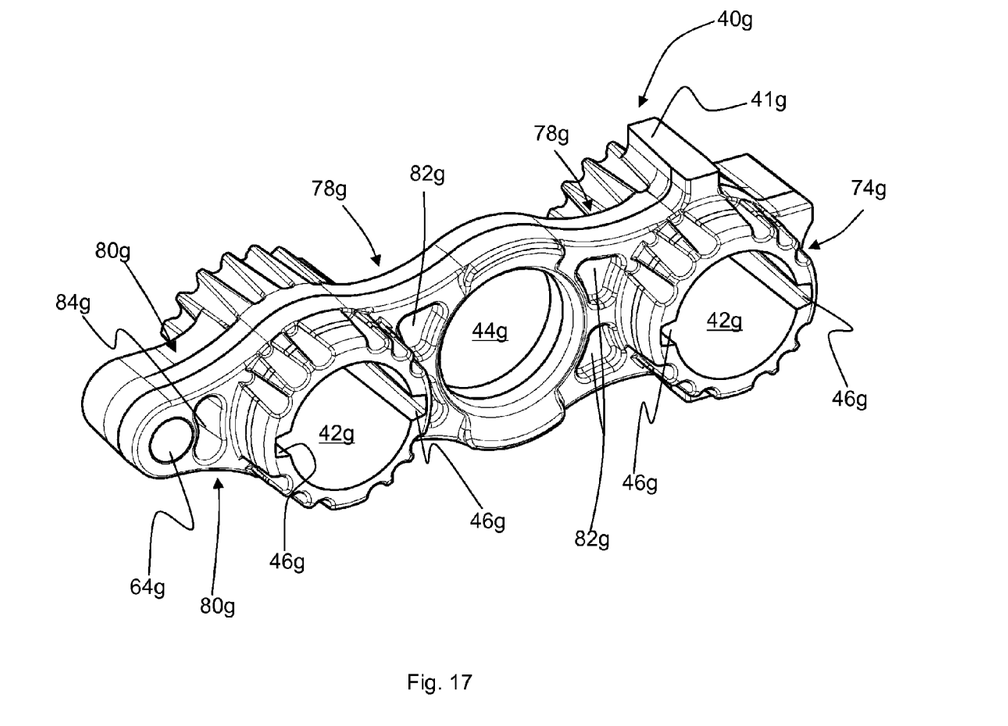
FIG. 17 shows a perspective view of the yoke of FIGS. 15 and 16.

Cut-outs 76g (not all labelled for clarity) are positioned around the cylindrical guide bush 42g of the yoke 40. In the present embodiment cut-outs are spaced circumferentially around each axial end of the guide bush 42g.

On a rotor side of the yoke, twelve cut-outs are circumferentially spaced around each guide bush 42g. The position of the cut-outs is grouped into four groups, and the cut-outs are equally spaced in each group. The spacing between each group is such as to avoid cut-outs in a position corresponding to the position of the slots 46g, and a region either side of each slot 46g. In alternative embodiments, the cut-outs may be positioned with any suitable spacing and/or any suitable number of cut-outs may be provided.

On the side of the yoke intended to be positioned innermost the housing, fourteen cut-outs are spaced around each guide bush 42g. The position of the cut-outs is grouped into two groups, and the cut-outs are equally spaced in each group. Each group of cut-outs extends from a region corresponding to the position of one slot 46g to a region corresponding to the other slot 46g. The spacing between each group is such as to avoid cut-outs in a position corresponding to the position of the bores 64g and a section either side of each slot 46g. In alternative embodiments, the cut-outs may be positioned with any suitable spacing and/or any suitable number of cut-outs may be provided.

In this embodiment, the cut-outs 76g have a semi-circular profile, i.e. the cross-section of the cut-out through the longitudinal length of the guide bush 42g is semi-circular. Further, in this embodiment, the cut-outs 76g taper from a wider end at a longitudinal edge of a respective guide bush to a narrower end at a central region of the guide bush. In alternative embodiments, the cut-outs may not be tapered and/or may have any other suitably shaped cross-section.

Providing cut-outs reduces the weight of the yoke 40g and can reduce the material required to manufacture the yoke, whilst retaining a sufficient strength. In alternative embodiments, the cut-outs may be of an alternative shape and/or an alternative number of cut-outs may be provided.

In the embodiment shown in FIGS. 15 to 17, the sides of the yoke extending between the guide bushes 42g (i.e. the upper and lower sides of the yoke as shown in FIG. 16) are profiled so as to form a concave formation 78g, between the guide bushes 42g and the aperture 44g. The concave formation 78g further reduces the weight of the yoke 40g and can reduce the material required to manufacture the yoke, whilst retaining a sufficient strength. In alternative embodiments the concave formations may be of any other suitable shape.

A circumferential region of the yoke between a position of the guide bush 42g nearest the bore 64g, and the bore 64g, is profiled for form a concave formation 80g, so as to further reduce the weight of the yoke 40g.

Holes 82g, 84g extend axially through the yoke from a side, in use, nearest the rotor to a side furthest the rotor. In this embodiment, two holes 82g are positioned between each guide bush 42g and aperture 44g, i.e. two holes 82g are either side of aperture 44g. In this embodiment the holes 82g are substantially triangular in shape with rounded vertices. A further hole 84g is positioned between one of the guide bushes 42g and the bore 64g. The hole 84g is substantially rectangular with the longitudinal ends of the rectangle being rounded. In alternative embodiments any suitable number of holes may be positioned through the yoke, at any suitable position and of any suitable shape. In a further alternative embodiment, the holes 82g, 84g may be replaced with depressions. The holes 82g, 84g further reduce the volume of the yoke and therefore reduce the weight of the yoke 40g.

Advantageously all the described embodiments of the present invention provide better location and guidance for the yoke than the guidance systems of the prior art because the yoke is supported in more directions than if the guide member were simply a surface formed in the housing and/or yoke. This is optimum in the embodiments shown in FIGS. 4 to 10 and FIGS. 14 to 17.

In all embodiments the guide member is a separate component to the housing which means that manufacture of the caliper is simplified.

When the caliper is used in a disc brake, when the brake is applied, the operating shaft 14 is rotated to actuate the piston assemblies. Due to the offset nature of the axes of rotation 16, 22 of the lever and rollers, a twisting motion can be applied to the piston assemblies. However, in the embodiments described in FIGS. 4 to 17, the reduced clearance between the yoke and the guide member means that the ratio (L/D) of the length (L) of the bore to the diameter (D) of the bore is maximised. Therefore the amount of pivoting of the yoke permitted by the arrangement is minimised. As a result, the risk of the yoke jamming against the housing is reduced and potential taper pad wear is inhibited.

When the brake caliper is used in a disc brake, and the brake is applied, brake drag can be transmitted to the piston assemblies of the disc brake. The minimal clearance that can be achieved in the described embodiments between the guide member and the yoke, particularly with a bush, and the support of the yoke in more than one direction, means that the drag load is resisted by the guide member. This reduces the likelihood of disc brake rattle. This advantage is further enhanced in the embodiment shown in FIGS. 4 to 6 because the second guide member 66b restricts tilting of the yoke, and in FIGS. 14 to 17 because the combination of the dowel 52g and guide surfaces 41g, 51g restrict tilting of the yoke.

Additionally, because the guide member is a separate component from the remainder of the brake caliper, the guide member(s) can be more easily precision machined and/or heat-treated (e.g. induction hardened) compared to the caliper guide surfaces of the prior art.

Although the invention has been described above with reference to one or more preferred embodiments, it will be appreciated that various changes or modifications may be made without departing from the scope of the invention as defined in the appended claims.

Figure 12:
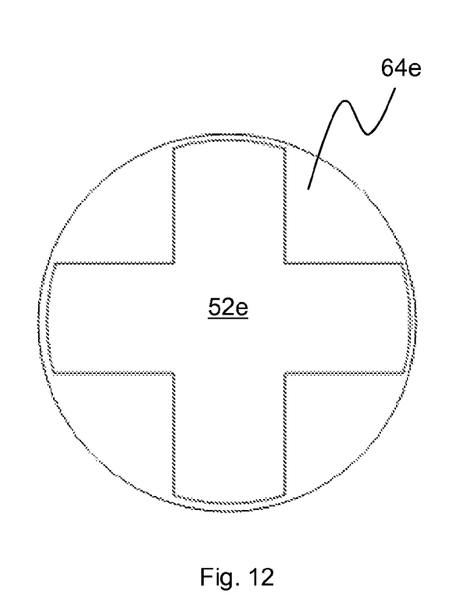
FIG. 12 shows a section view of a bore formed in a housing, and a guide member of a brake caliper according to a fifth embodiment of the invention.
Figure 13:
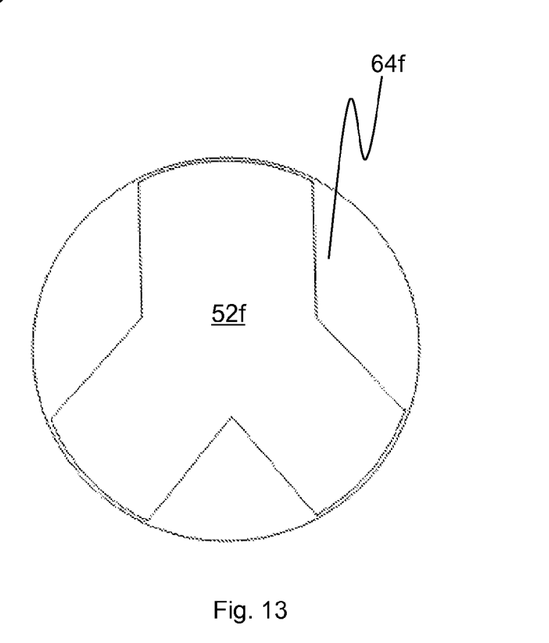
FIG. 13 shows a section view of a bore formed in a housing, and a guide member of a brake caliper according to a sixth embodiment of the invention.

For example, in the described embodiments, the guide member and/or bore formed in the yoke to receive the guide member, have a circular cross section. However, in alternative embodiments the cross section may not be circular. For example, referring to FIG. 11, the bore 64d may comprise 3 longitudinal projections 70 extending along the length of the bore, so as to reduce the area of contact between the inner surface of the bore 64d and the guide member 52d. Alternatively, referring to FIGS. 12 and 13, the bore 64e, 64f may have a circular cross section, but the guide member, in these embodiments a guide pin, may be non-circular. For example, the guide member 52e may have a cross-shaped cross section, as shown in FIG. 12, or the guide member 52f may have a Y-shaped cross section, as shown in FIG. 13.

Although the present invention has been described for use with an air actuated disc brake, the present invention may also be used with an electro-mechanically actuated disc brake.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake caliper comprising:
a housing having at least one guide surface;
a piston for moving a friction element into contact with a rotor;
a yoke for at least partially guiding the piston, wherein the yoke is positioned within the housing and is moveable relative to the housing and comprises a bore and at least one yoke guide surface that is disposed to oppose the at least one guide surface; and
a guide member along which the yoke is slideable, wherein the guide member is a guide pin;
wherein the guide member is a component separate from the yoke and the housing and is mounted to the housing; and
wherein the bore slidingly engages the guide pin, the guide pin and the bore are positioned towards one side of the yoke, and the at least one yoke guide surface is disposed proximate an end of the yoke that is opposite the guide pin and the bore.

2. The disc brake caliper according to claim 1 wherein the guide member is a dowel.

3. The disc brake caliper according to claim 1 wherein the guide member is connected to the housing via an interference fit.

4. The disc brake caliper according to claim 1 wherein the guide member is connected to the housing via a cantilever mount.

5. The disc brake caliper according to claim 4 further comprising a cover plate, wherein the guide member extends from the housing towards the cover plate to a position spaced from the cover plate.

6. The disc brake caliper according to claim 1 further comprising a bush located within the bore.

7. The disc brake caliper according to claim 1 wherein the yoke further comprises cut-outs for reducing weight of the yoke.

8. The disc brake caliper according to claim 7 wherein the cut-outs are positioned circumferentially around a portion of the yoke used to guide the piston.

9. The disc brake caliper according to claim 1 wherein the guide pin has a circular or oval cross section.

10. The disc brake caliper according to claim 1 wherein the yoke further comprises a cylindrical guide bush for receiving the piston, and wherein the guide bush and piston each further comprise complimentary mating members for limiting rotation of the piston relative to the yoke.

11. The disc brake caliper according to claim 1 wherein the yoke further comprises a recess for accommodating an adjuster stem of a manual adjuster.

12. A disc brake caliper comprising:
a housing;
a piston for moving a friction element into contact with a rotor;
a yoke for at least partially guiding the piston, the yoke being positioned within the housing and moveable relative to the housing;
a guide pin along which the yoke is slideable, wherein the guide pin is a component separate to the yoke and the housing and is mounted to the housing, and wherein the guide pin is connected to the housing via an interference fit, and the connection to the housing is a cantilever mount; and
a cover plate positioned at a rotor side of the disc brake caliper;
wherein the guide pin extends from the housing towards the cover plate to a position spaced from the cover plate and wherein the yoke is slideable in direct contact with the guide pin.

13. The disc brake caliper according to claim 12 wherein the yoke further comprises cut-outs positioned circumferentially around a portion of the yoke used to guide the piston.

14. The disc brake caliper according to claim 12 wherein the cover plate is secured to the housing by at least one threaded fastener having a threaded end and a head end and oriented in a direction substantially parallel to an axis of the piston such that the head end is at the rotor side of the disc brake caliper.

15. The disc brake caliper according to claim 12 further comprising an actuating element, the actuating element being configured such that brake thrust from the actuating element is not transmitted through the yoke.

16. The disc brake caliper according to claim 12 wherein the piston is axially moveable with respect to the yoke.

17. A disc brake caliper comprising:
a housing including a guide member;
a piston assembly that has a rotating part having a male thread and a non-rotating part having a female thread;
a yoke for at least partially guiding the piston assembly within the housing, wherein the yoke further comprises a guide bush for receiving the piston assembly and a bore that receives the guide member such that, in use, the yoke can slide along the guide member of the housing; and
an anti-rotation feature having a mating member disposed on the guide bush and a complimentary mating member disposed on the non-rotating part of the piston assembly for limiting rotation of the piston assembly relative to the guide bush such that rotation of the rotating part of the piston assembly increases a length of the piston assembly.

18. The disc brake caliper according to claim 17 wherein the yoke further comprises cut-outs for reducing weight of the yoke.

19. The disc brake caliper according to claim 17 wherein the yoke further comprises circumferential depressions for reducing weight of the yoke.

\* \* \* \* \*